United States Patent [19]

Milch

[11] Patent Number: 4,638,371
[45] Date of Patent: Jan. 20, 1987

[54] MULTIPLE EXPOSURE OF AREA IMAGE SENSOR HAVING A SPARSE ARRAY OF ELEMENTS

[75] Inventor: James R. Milch, Pittsford, N.Y.

[73] Assignee: Eastman Kodak Company, Rochester, N.Y.

[21] Appl. No.: 710,206

[22] Filed: Mar. 11, 1985

[51] Int. Cl.[4] .................. H04N 1/10; H04N 3/06; H04N 5/30; H04N 9/04

[52] U.S. Cl. .......................... 358/293; 358/41; 358/50; 358/55; 358/75; 358/199; 358/205; 358/209; 358/212; 358/213; 358/225; 358/294

[58] Field of Search ............. 358/41, 43, 44, 50, 358/53, 54, 55, 75, 78, 199, 205, 209, 212, 213, 214, 225, 293, 294

[56] References Cited

U.S. PATENT DOCUMENTS 4,331,979 5/1982 Bendell ........................... 358/214
4,479,149 10/1984 Yoshioka et al. ............... 358/294
4,485,409 11/1984 Schumacher .................... 358/294

FOREIGN PATENT DOCUMENTS

101939 9/1978 Japan .............................. 358/213

Primary Examiner—James J. Groody
Assistant Examiner—Randall S. Svihla
Attorney, Agent, or Firm—Raymond L. Owens

[57] ABSTRACT

Pixels of a digital image are produced by an area image sensor which includes a sparse array of elements. Each element is multiply exposed by different pixels of a light image. The light image is scanned in such a pattern between element exposures so that each digital image pixel has a nearest-neighbor digital image pixel that was produced by a different sensor element. By means of this arrangement, a high quality image can be produced from the digital image even if a sensor becomes defective (drops out).

2 Claims, 10 Drawing Figures

MULTIPLE EXPOSURE OF AREA IMAGE SENSOR HAVING A SPARSE ARRAY OF ELEMENTS

BACKGROUND OF THE INVENTION

The present invention relates to apparatus that provides relative movement between a light image and an area image sensor having sensor elements so arranged that each element samples a plurality of pixels of the light image.

Solid-state image sensors generally have a linear or area organization. A linear sensor will often have a row of sensor elements (usually photodiodes or photocapacitors) and one or more CCD shift registers. The elements sample a line of light from a light image and integrate (accumulate) charge representative of light passing through image pixels. After this integration, the charge is transferred to a CCD shift register. The charge is shifted out of the shift register and converted by an MOS transistor or diode into a voltage signal. This voltage signal is converted into a numerical representation suitable for input to a digital image processor. The next line of the image is then moved in front of the linear sensor and the above process is repeated. The integration time for an element has to be sufficiently long compared to the time for readout to minimize smearing. Linear sensors are inherently time-limited for image sampling. They are not satisfactory for use in some applications such as for example high speed printers for making prints of film negatives. Such a high speed printer requires an area image sensor that is capable of measuring the transmittance of a film negative quite rapidly, with high accuracy, and at high spatial frequency.

An area image sensor offers the advantage of increased integration time for each element. In some applications a large number of image pixels have to be digitized. For example, to make a high quality colored print of a photographic negative, on the order of about two million image pixels should be digitized for each color (red, green and blue) of a photographic negative to produce a high quality output print. With existing technology, area image sensors have about one hundred thousand elements. Thus each element of an area image sensor must sample a plurality of image pixels.

Interline area image sensors having a sensor with an array of sparse elements, provide an organization which lends itself to multiple element sampling of light image pixels. A sparse array of elements is one in which the elements are spaced from one another. The area image sensor is called interline since CCD shift registers are placed between columns of sensor elements. The light image need only be moved a relatively small distance for each sensor element to sample a different pixel of the light image. Digital images produced by sensors are stored in frame store memories. When digital images are produced by linear sensors or area sensors where a sensor element only samples a single light image pixel, then if a sensor element is defective it produces a defective digital image pixel. In one technique the value of a nearest neighbor digital image pixel is substituted. In other words, the procedure is simply to replace the value of a defective digital image pixel with the value of a nearest neighbor produced by another operative sensor element. In another technique interpolation of the values of nearest neighboring digital image pixels is used. See, for example, U.S. Pat. No. 4,253,120, issued Feb. 24, 1981, which teaches that, if lower resolving optics for imaging onto a high resolution imager are employed, any given image spot will overlap more than one pixel; and, attendantly, when a pixel is bad, interpolation can be employed to obscure, in real time, the effect of such bad pixel. However when an area image sensor having a sparse array of elements is used where each element senses a plurality of image pixels to produce a digital image, then some digital image pixels may not have nearest neighbors produced by other elements. In such a case the previous techniques for obviating the effect of one or more defective sensor elements may be less than acceptable.

SUMMARY OF THE INVENTION

In accordance with this invention, an apparatus is provided which accurately moves a light image relative to an area image sensor in such a pattern that pixels of the digital image produced by individual elements of an area image sensor having a sparse array of elements have a nearest neighbor digital pixel produced by a different array element.

It is an advantage of this invention to permit well known techniques to be used to provide high quality output images when a sensor element becomes defective (drops out).

It is another advantage of this invention that correction algorithms can be designed to replace defective digital image pixels with their nearest neighbors which are more simplified than algorithms which have to replace defective digital pixels with their next-nearest neighbors.

It is still another advantage of this invention that movement patterns selected in accordance with the invention minimize the appearance effects of sensitivity pattern noise in output images. Sensitivity pattern noise is the variability from element-to-element in the sensitivity of sensor elements.

BRIEF DESCRIPTION OF THE DRAWINGS

FIG. 1b shows in more detail the organization of the area image sensor shown in FIG. 1a;

DESCRIPTION OF THE PREFERRED EMBODIMENT

Figure 2:
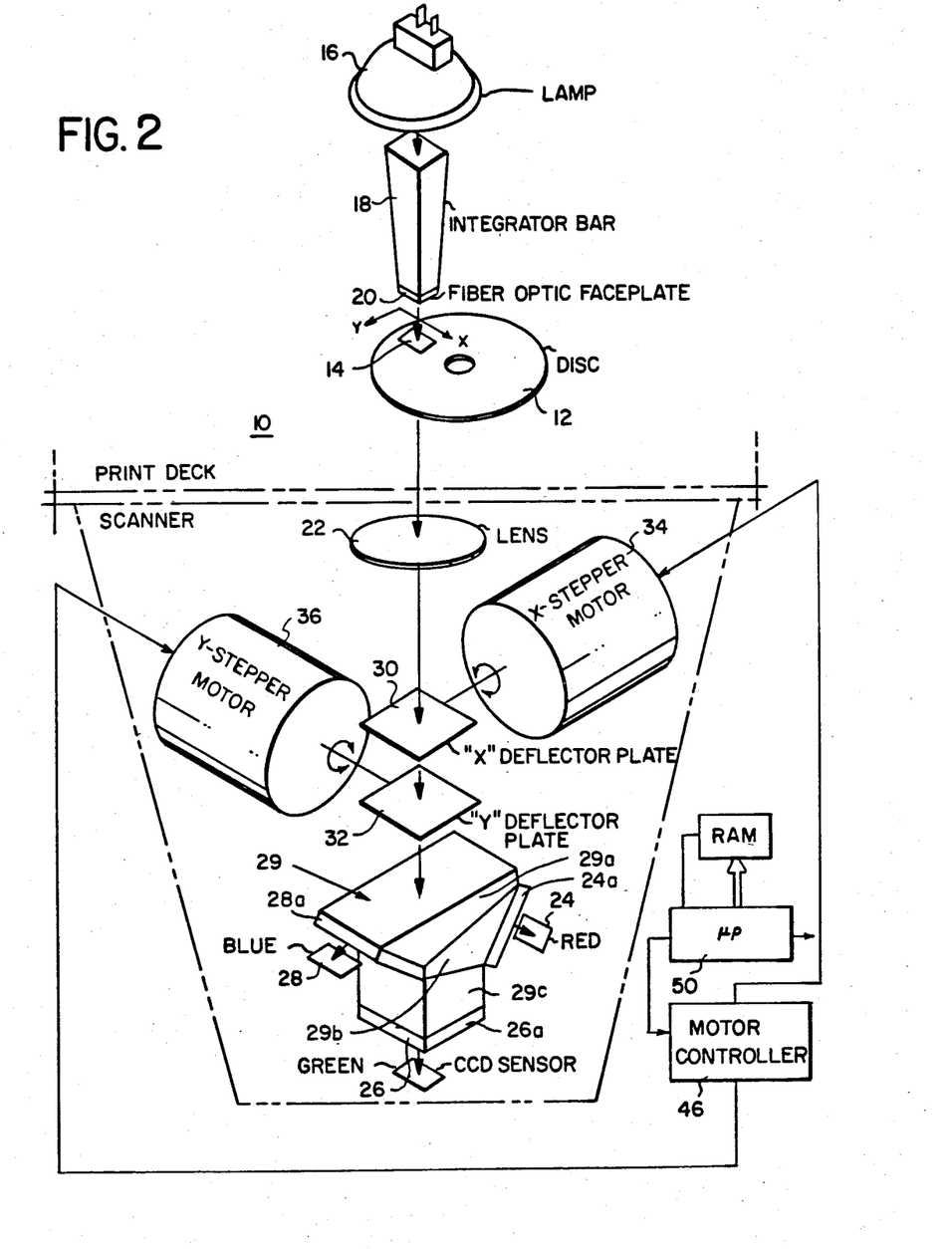
FIG. 2 shows a scanning apparatus which uses three area image sensors in accordance with the present invention.

FIG. 2 shows in schematic form a scanning apparatus 10 for scanning a film negative. The apparatus includes a disk member 12, for holding an original which is a photographic film negative 14. The film negative 14, is illuminated by light from a lamp mounted in a lamp housing 16. The lamp contained in this housing can for example be a 600-watt tungsten lamp and the housing can include an elliptical reflector for collimating light from the lamp. A tapered integrating bar 18 along with a fiber optic face plate 20 produces diffused light (for scratch suppression). Light which passes through the negative is collected by a lens 22 and focused upon the surface of three area image sensors 24, 26 and 28.

Each of the area sensors 24, 26, and 28 are identical in construction and are panchromatic. However, sensor 24 receives only red colored light; sensor 26 receives only green colored; and sensor 28 receives only blue colored light. To this end, a beam splitter 29 is disposed between the lens 22 and sensors 24, 26, and 28. The beam splitter 29 separates three colored light beams (red, green, and blue) from light which is transmitted through the negative 14 and may take a number of well-known forms. For example, one conventional beam splitter (as illustrated in FIG. 2) comprises three prism components—29a, 29b, and 29c. Prism 29a has a blue reflecting coating on the second surface encountered by the light beam. This surface is spaced from the second prism 29b by a small air gap so as to enchance the reflection of blue light. The second prism 29b and the third prism 29c are cemented at their interface with the inclusion of a metallic coating such as INCONEL ® (Reg. Trademark of International Nickel Company) between the second and third prism. The coating is not intended to provide color separation but instead reflects and transmits equal amounts of red and green light. Prism trim filters 24a, 26a, and 28a transmit separate red, green, and blue light beam images with the required spectral makeup to the respective area image sensors 24, 26, and 28. Each of these colored light beams forms a particular colored light image (or real image) of the film negative 14 which is focused on its sensor. An example of a beam splitter device which can be used in accordance with the invention is disclosed in commonly assigned U.S. Pat. No. 4,541,688, issued Sept. 17, 1985, entitled "Optical Beam Splitters" by P. B. Watt et al.

Between the lens 22 and the beam splitter 29 are disposed the two parallel-sided glass plates 30 and 32 respectively. The glass plates are made from optical glass such as that manufactured by Schott Optical Glass, Inc., No. BK 7-517642. Each glass plate has two optically flat surfaces and when rotated displaces the light image laterally. A relatively large angular rotation of these plates (2°) corresponds to a small translational movement of a light image (0.002").

In addition, when glass flats are used the optical axis remains a straight line, thereby simplifying optical alignment. Image displacement is independent of the axial position of the glass plates or the lens focal length, which is not the case when a mirror is used for image displacement.

Rotation of the glass plate 32 about an axis of rotation translates the light image in the y-scan direction across the surface of each of the three area image sensors 24, 26 and 28 respectively. Similarly, rotation of the glass plate 30 about an axis of rotation causes translational movement of the light image in the x-direction (orthogonal to the y-direction) along the surface of each of the three area image sensors. A first stepper motor 34 is adapted to incrementally rotate glass plate 30 and a second stepper motor 36 is adapted to incrementally rotate glass plate 32. These stepper motors are each under the control of a stepper motor controller 46. A microprocessor (μp) 50 provides stepper motor control signals to the stepper motor controller 46. Rather than stepper motors, a servo-control system could be used to move the glass plates.

Figure 1A:
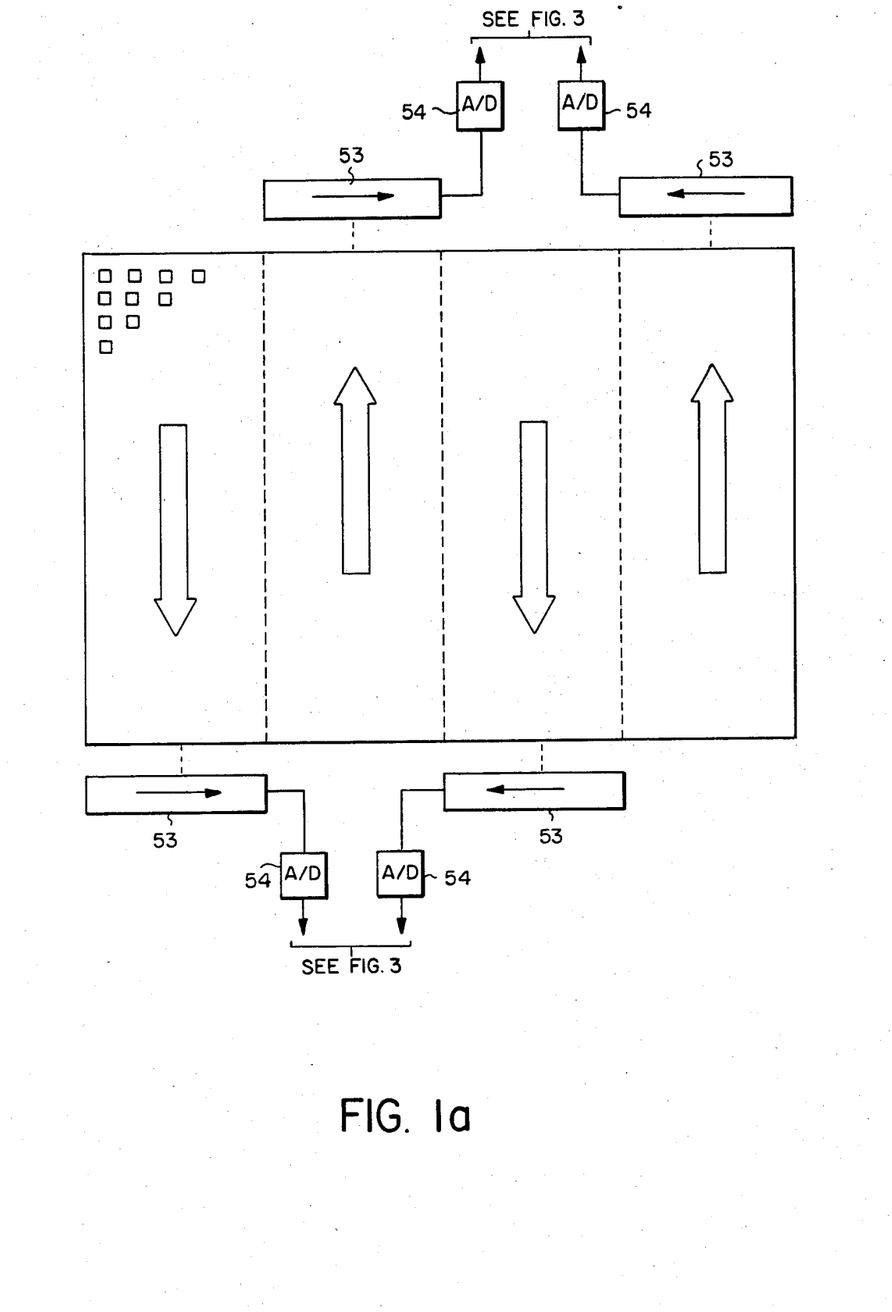
FIG. 1a is a schematic showing of an area image sensor which can be used in accordance with the invention.
Figure 1B:
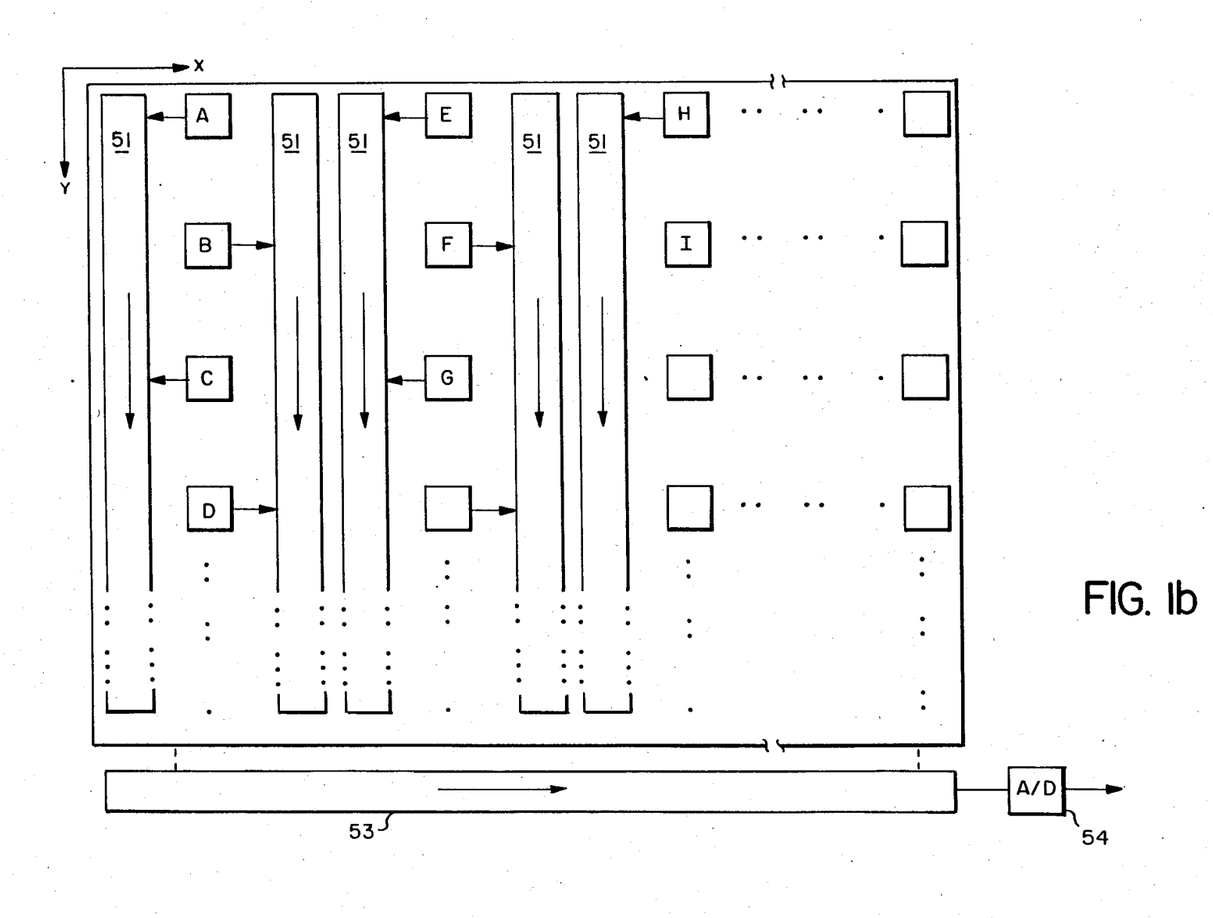
Figure 1C:
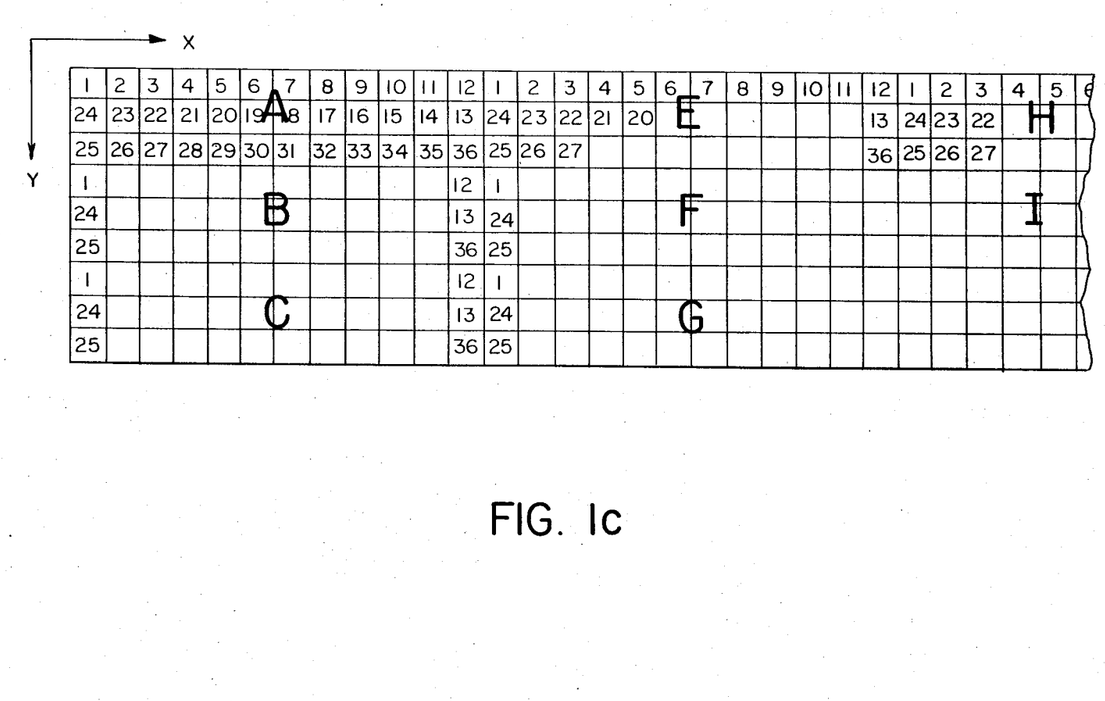
FIGS. 1c and 1d illustrate a pattern by which elements of an area image sensor with an organization illustrated in FIGS. 1a and 1b, samples pixels of a light image.
Figures 3, 3A:
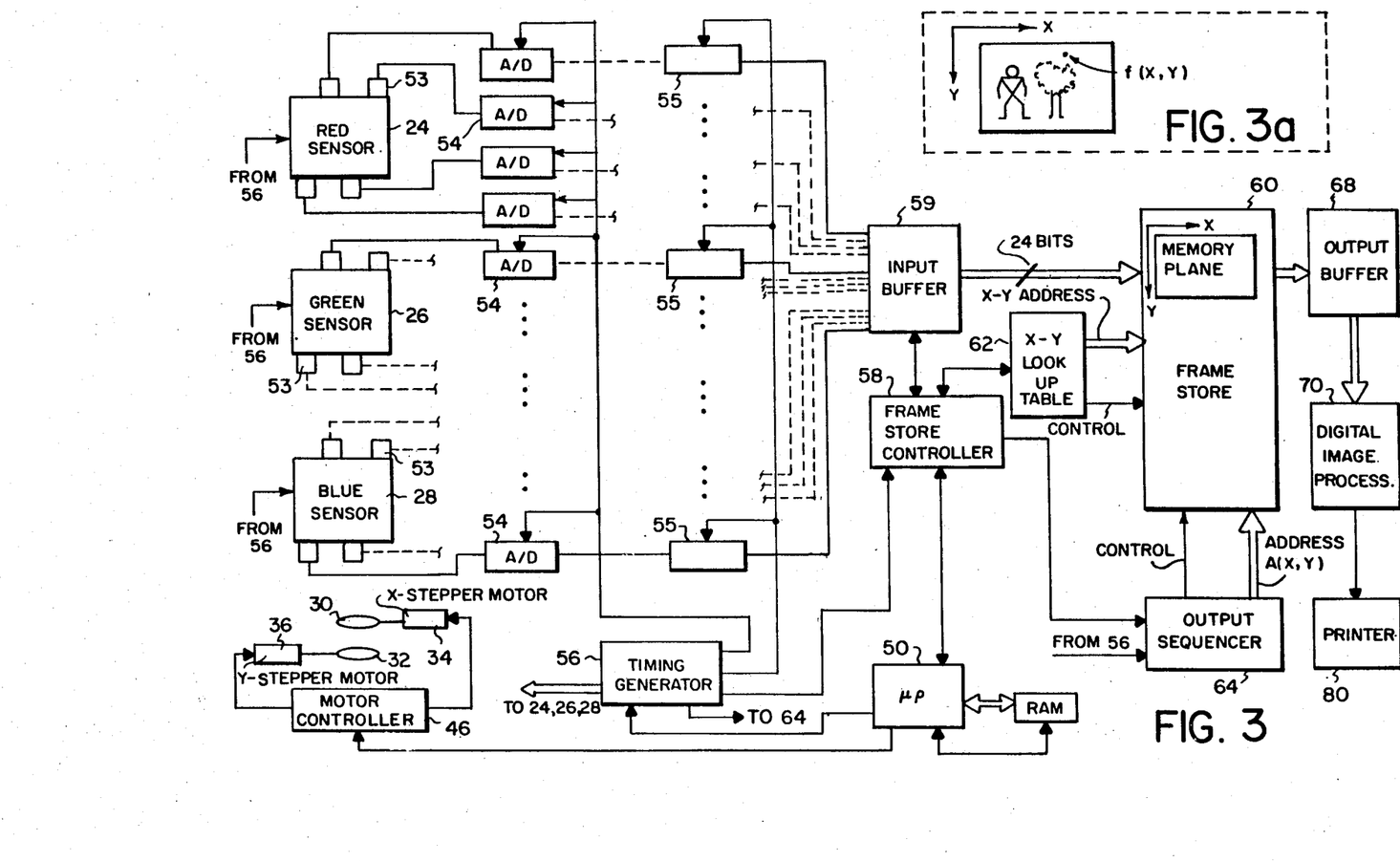
FIG. 3 shows in block diagram form, the elements of a system for digitizing the output signals from the three area image sensors of FIG. 2 and arranging the digital output signals spatially to form a digitized image in a memory plane.
FIG. 3a illustrates the coordinate system used throughout this disclosure for spatially arranging digital images.

FIGS. 1a and 1b schematically show the general organization of an area image sensor having a sparse array of sensor elements which can be used in accordance with the invention. Several of the sensor elements which are shown in FIG. 1b are identified as A, B, C, D, E, F, G, H and I. The elements are arranged in columns. Between each column there are conventional interline CCD shift registers 51. During an exposure cycle, each of the sensor elements samples a different pixel of the light image of the negative 14. For convenience of explanation, we will assume that for each sensor element, the origin is at the upper left hand position of that portion of the light image of the original from which the sensor will sample light image pixels. This coordinate system is shown in FIG. 3a. For example, as shown in FIG. 1c, assume that element A of FIG. 1b samples light image pixel "1" at its position (1,1) of the light image shown in FIG. 1c. Each of the other elements, B, C, D, E, F, G, H and I will also sample their own respective light image pixel "1" at their positions (1,1).

With reference to FIGS. 1c and 2, after each element samples its position at (1,1) (light image pixel "1"), the microprocessor 50 delivers a signal to stepper controller 46 for stepper motor 34, which rotates plate 30 an increment so as to laterally translate the light image in the x direction an amount so that each element is now at its light image position (2,1) and samples light image pixel 2. In a similar manner, after pixel 2 has been sampled, in order to sample pixel 3, the stepper motor 34 is again energized and incremented so that all of the elements sample their corresponding light image pixel 3; this continues to position 12. When light image pixel 13 is to be sampled, the stepper motor 36 however must be energized while motor 34 is not energized. In this case, the light image will be incrementally moved laterally in only the y direction. Subsequent incremental energization of stepper motor 34 will result in the sampling of image pixels 13 thru 24.

Figure 1D:
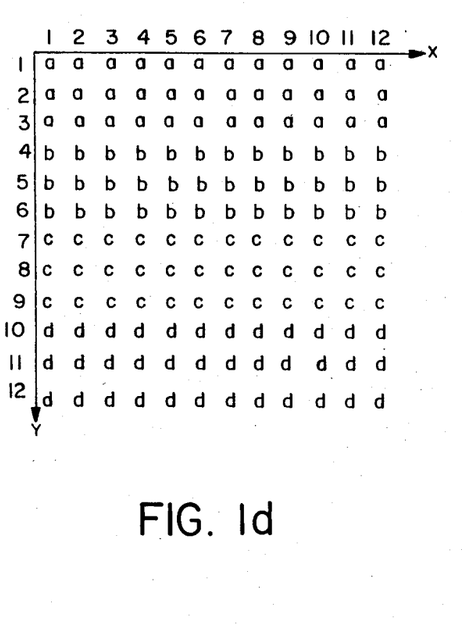

Once again, motor 36 must be energized to sample pixel 25. Pixels 25 thru 36 are sampled by the subsequent incremental energization of motor 34. Each sensor element thus samples thirty-six (36) different light image pixels. As shown in FIG. 1c, the light image pixels sampled form a block of 36 pixels organized in a rectangular 12×3 pattern. FIG. 1d shows the identical arrangement of FIG. 1c. However the pixels sampled by element A are labeled "a". Similarly sensor B sensed pixels are labeled "b" and sensor C sensed pixels are labeled "c". If element C for example should be defective (drops out), the entire 12×3 labeled "c" block which was scanned will be lost. The usual recovery procedure for digital images where a pixel is defective, (to fill the lost region with its nearest neighbor), is not entirely effective here because not all of the unknown pixels have a known nearest neighbor. The ten pixels in the center of each interior block sampled by an individual sensor would have to be replaced not by a nearest neighbor, but by a next-nearest neighbor produced by other sensors. This problem will always occur when individual sensor elements respectively produce digital image pixels having at least three columns and at least three rows of digital pixels.

Figure 1E:
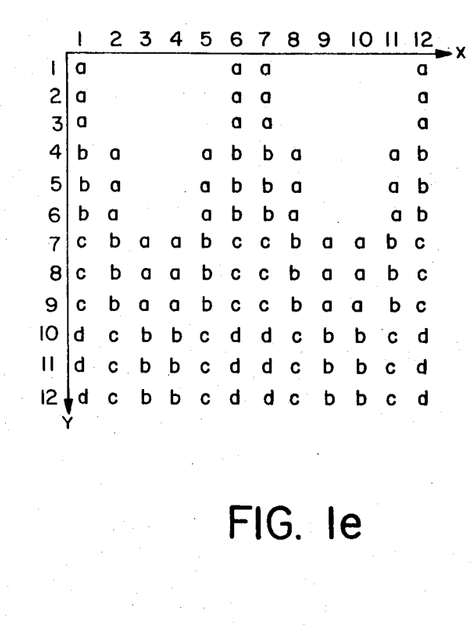
FIGS. 1e–1g illustrate improved light image sampling patterns in accordance with the present invention produced by elements of area image sensors where each element samples the same number of pixels of a light image as the FIG. 1c pattern.
Figure 1F:
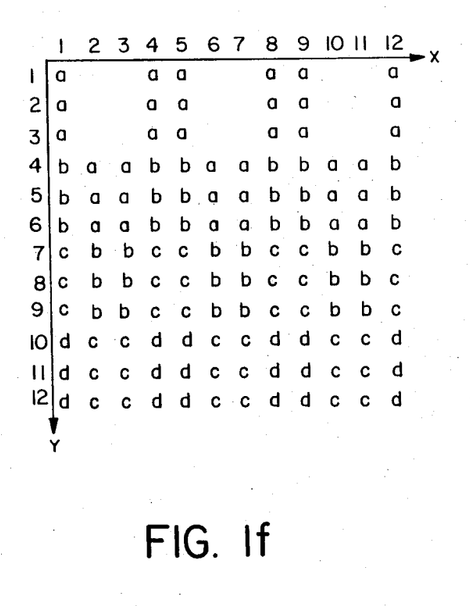
Figure 1G:
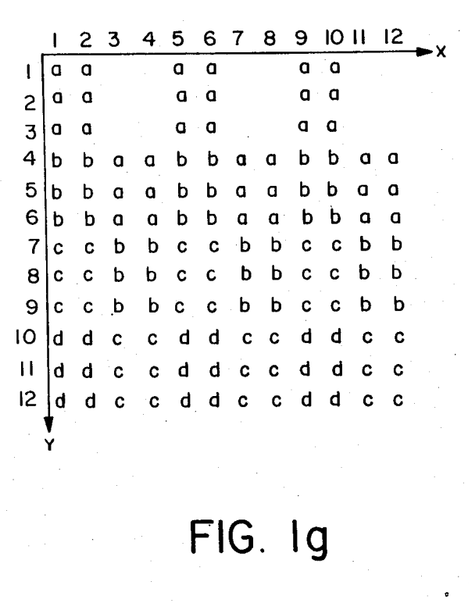

FIGS. 1e–1g show improved sampling patterns in which this problem is solved.

Turning to FIG. 1e, each sensor again samples 36 light image pixels. Stepper motors 34 and 36 are selectively incrementally energized by μ/p50. In sequence sensor A, for example, senses the following positions (x, y) of the light image: (1,1), (1,2), (1,3), (2,4), (2,5), (2,6), (3,7), (3,8), (3,9), (4,9), (4,8), (4,7), (5,6), (5,5), (5,4), (6,3), (6,2), (6,1), (7,1), (7,2), (7,3), (8,4), (8,5), (8,6), (9,7), (9,8), (9,9), (10,9), (10,8), (10,7), (11,6), (11,5), (11,4), (12,3), (12,2) and (12,1).

Even with the limitation that the light image must not be moved more than one x incremental lateral step and one y incremental lateral step at a time, many patterns are possible. FIGS. 1e–g show only three respresentative sampling patterns or dither schemes which guarantee that every digital pixel has a neighbor scanned by a different element. Other patterns will suggest themselves to those skilled in the art. With any of these patterns, the loss of a single element will not cause substantial degradation of an output image. At the edges of a digital image there are pixels without a next-nearest neighbor produced by another sensor, and, along the top edge there are holes. A hole is a pixel position which has not been sampled by a sensor element. One can either trim the edges and/or fill the top edge holes with neighboring values. An example of a hole is at position (3,1) of FIG. 1e. It should be noted that the patterns of FIGS. 1f and 1g minimizes the number of holes.

It will be understood that each area image sensor could be comprised of a sparse array of either photodiodes or capacitor elements. The photocharge which is accumulated in either a photodiode or a photocapacitor is transferred to an interline CCD shift register 51. Those skilled in the art will appreciate that the shift registers 51 conveniently can be constructed as a buried-channel two-phase device.

In order to prevent charge smearing, alternate elements in a column of elements are read out into the interline shift register 51 on opposite sides of the column. This is best shown in FIG. 1b. Each shift register 51 will be under the control of a plurality of electrodes (not shown). When a potential is applied to an electrode opposite an element, a depletion region is formed under that electrode. Consider for example an area image sensor which is formed with a p-substrate covered with a silicon dioxide layer on which there has been deposited a row of closely spaced electrodes for operating a shift register 51. When a positive potential is applied to any one of the electrodes, it repels the holes into the substrate. Lattice electrons are exposed and a depletion region is formed. The potential profile of the depletion region is referred to as a well.

Negative charge is of course accumulated under each element. After an adjacent well in a shift register is formed, and assuming the well is deeper than the charge region under the element, electrons will flow into the well of the shift register where they are free to move about but cannot penetrate the potential walls of the well. The potential profile (voltage) on the different electrodes of the shift register are now changed so that charge can be simultaneously shifted down each vertical shift register into four separate horizontal readout shift registers.

By using four horizontal readout shift registers 53 as shown in FIG. 1a for each image area sensor, the output data rate can be greatly reduced; it is in fact, divided by four. The four large arrows show in FIG. 1a indicate the direction of signal transfer from a sensor to the horizontal shift registers 53 and a the smaller arrows indicate the direction of charge transfer through the horizontal shift registers 53. Each horizontal register 53 is directly connected to its own analog-to-digital converter 54.

As shown in FIG. 3a, the light image of a negative which is sampled by the elements of the area image sensors can be considered to be a two-dimensional light intensity function f (x,y), where x and y denote spatial coordinates and the digital value of the function at any point (x,y) is proportional to the brightness or gray level of the image pixel which was sampled.

As shown in FIG. 3, a digital image corresponding to a light image of a photographic negative is stored in a memory plane of a frame store 60. The memory plane is made up of a plurality of dynamic RAMs. The row and column numbers x,y spatially identify a digital pixel. The value stored represents brightness or gray scale. In this case, for each digital image pixel 24 bits are stored; 8 bits gray scale for red, 8 bits gray scale for green and 8 bits for blue.

A single A/D converter 54 is connected to the output port of each sensor horizontal shift register 53. As shown there are twelve A/D converters 54. Each A/D converter 54 is an 8 bit digitizer (256 gray levels). The microprocessor 50 provides the control signals to the stepper motor controller 46, timing generator 56 which provides timing signals to the image area sensors 24, 26 and 28, the A/D converters 54 and correction circuits 55. A correction circuit 55 is connected to each A/D converter 54 and will be understood to correct digital signal levels for sensor photosensitive errors. Timing generator 56 also provides timing signals to a frame store controller 58 and an output sequencer 64.

After corresponding pixels from sensors 24, 26, and 28 are digitized, they are combined in input buffer 59. A new 24 bit signal is formed which represents red, green and blue levels. Thereafter, the frame store controller 58 provides a control signal to an x/y lookup table 62. Table 62 produces an address (x,y) which represents the location of the digital image pixel in the memory plane. The lookup table 62 causes each digitized image pixel (24 bits) to be stored in a particular cell in the memory plane corresponding to the location on the photographic negative from which the color information was scanned. When all of the cells of a memory plane are filled, a digital image is produced.

An output sequencer 64 is also under the control of the frame store control logic 58. It produces an address A(x,y) for reading out a digital image pixel having color information content. An output buffer 68 sequentially stores digital image pixel data from a digital image. It will be understood that the control signals provided by logic associated with lookup table 62 provide refresh signals to the memory plane RAMs and also an enable signal which permits digital pixel information to be read into memory. The output sequencer 64 provides control signals which enable output digital pixels to be read out from a digital image in a memory plane.

The output buffer 68 delivers digital image pixel data to a digital image processor 70. The purpose of the digital image processor is to process a digital image so that a printer 80 will provide an output print which is more suitable for viewing than if processing had not taken place. It may function in accordance with image enhancing algorithms to achieve grain suppression, edge enhancement and tone scale enhancement. Examples of digital image processing algorithms are set forth in commonly assigned U.S. Pat. Nos. 4,399,461, 4,442,454, and 4,446,484. Also an example of a printer 80, would be a laser printer such as disclosed for example, in commonly assigned U.S. patent application Ser. No. 619,453, entitled "Light Beam Intensity Controlling Apparatus", filed June 11, 1984, in the names of Balwin et al.

When the scanning patterns shown in FIGS. 1e-g are used, the image processor 70 also will be understood to include an algorithm which will replace a digital image pixel produced by a defective sensor element. The algorithm will substitute the value of a digital image pixel produced by a nearest neighbor by an effective sensor element.

Briefly, the operation of the apparatus of FIGS. 2 and 3 will be described assuming that light image of the negative is scanned for four milliseconds (ms) at each position of the image sensor. We will further assume each area image sensor has an array of 60,000 elements. During each four ms of a scanning period, the 60,000 active elements on each sensor integrate the light transmitted by 60,000 light image pixels on the negative. At the end of this time, the integrated charges are transferred to the shift registers 51 and the glass plates 30, and 32 are selectively rotated to new positions. During the subsequent four ms scanning period, the charge packets are transferred out for processing via the vertical 51 and horizontal shift registers 53. The charge packets are digitized and transferred to the appropriate location in a memory plane. Simultaneously 60,000 new pixels are being integrated. After each elements makes 36 samples, 2.16 million digital pixels for each sensor will have been produced and a high resolution digital image with color information content will have been formed in a memory plane.

If we assume for example that the entire negative must be read out 144 ms, then the data rate in pixels (charge packets) per second is $(2.16 \times 10^6 \text{ pixels})/(100 \times 10^{-3} \text{ seconds})$ or about $22 \times 10^6$ (pixels/sec.). At this data rate, there is a high likelihood of signal distortion. By using four separate output shift registers, the data is reduced from 22 MHz to 5.4 MHz. Digital pixels can be processed at this rate without distortion.

I claim:

1. Image scanning apparatus comprising an area sensor including a sparse array of sensor elements which are exposed by pixels of a light image, said pixels of said light image being effectively the same size as said sensor elements, such that at a given relative position between said sensor and said light image, nearest-neighbor sensor elements of the array are exposed by non-neighboring pixels of the light image, means responsive to said exposed sensor elements to produce a digital image and means for moving the light image relative to the sensor to produce successive exposures of each sensor element by different light image pixels which have not previously exposed a sensor element, said moving means being adapted to move the light image relative to the sensor in such a pattern that digital image pixels of the digital image produced by individual sensor elements have nearest-neighbor digital image pixels produced by different sensor elements, and means coupled to the sensor and responsive to the successive exposures of the sensor elements for forming a digital image having rows and columns of digital image pixels, wherein the successive exposures of each sensor element produce digital image pixels in at least three different columns and three different rows of said digital image.

2. A method of producing a digital image of a light image which illuminates a sensor comprising the steps of moving a light image relative to a sensor having a sparse array of sensor elements such that at a given relative position between said sensor and said light image, nearest-neighbor sensor elements of the array are exposed by non-neighboring pixels of the light image, said pixels of said light image being effectively the same size as said sensor elements, and such that at succeeding relative positions between said sensor and said light image, each sensor element is exposed by a different light image pixel which has not previously exposed a sensor element in a pattern such that a digital image is produced having rows and columns of digital image pixels and wherein each sensor element is exposed a sufficient number of times to produce digital image pixels in three different columns and three different rows of said digital image and each digital image pixel has a nearest-neighbor digital image pixel produced by a different sensor element.

* * * * *